United States Patent [19]

Jeung

[11] Patent Number: 5,518,194
[45] Date of Patent: May 21, 1996

[54] FISHING REEL WITH SOUND GENERATOR

[75] Inventor: Jong-O Jeung, Inchon, Rep. of Korea

[73] Assignee: Bando Leports Ltd., Inchon, Rep. of Korea

[21] Appl. No.: 226,502

[22] Filed: Apr. 12, 1994

[30] Foreign Application Priority Data

Apr. 13, 1993 [KR] Rep. of Korea .......................... 5800/93
Jun. 11, 1993 [KR] Rep. of Korea ........................ 10220/93
Nov. 1, 1993 [KR] Rep. of Korea ........................ 22700/93

[51] Int. Cl.⁶ .................................................. A01K 89/00
[52] U.S. Cl. ............................ 242/283; 242/282; 242/306; 411/398
[58] Field of Search .................................. 242/245, 246, 242/282, 283, 284, 306, 307, 308; 411/396, 398, 399, 401

[56] References Cited

U.S. PATENT DOCUMENTS

| 1,880,375 | 10/1932 | Davis, Jr. | 411/396 |
|---|---|---|---|
| 3,027,113 | 3/1962 | Berger et al. | 242/306 X |
| 4,369,930 | 1/1983 | Noda | 242/282 |
| 4,513,925 | 4/1985 | Yamaguchi | 242/245 |
| 4,702,432 | 10/1987 | Kaneko et al. | 242/246 |
| 4,850,549 | 7/1989 | Sakumoto | 242/282 X |
| 5,022,606 | 6/1991 | Hashimoto | 242/307 |
| 5,149,007 | 9/1992 | Saito | 242/246 |
| 5,149,009 | 9/1992 | Sato | 242/306 X |
| 5,297,757 | 3/1994 | Johansson et al. | 242/306 |
| 5,308,020 | 5/1994 | Kawabe | 242/284 |
| 5,350,130 | 9/1994 | Hitomi et al. | 242/311 X |

*Primary Examiner*—Daniel P. Stodola
*Assistant Examiner*—William A. Rivera
*Attorney, Agent, or Firm*—Brumbaugh, Graves, Donohue & Raymond

[57] ABSTRACT

A fishing reel with a drag sound generating portion produces click sounds when a fish has been hooked. In the drag sound generating portion, a drag cap has spring holder rods for a plate spring. For positive click generation by a click spring in a spool operation sound generating portion, a crank handle joining portion is securely fastened without gap between a rotary shaft and a driving shaft.

2 Claims, 7 Drawing Sheets

FISHING REEL WITH SOUND GENERATOR

BACKGROUND OF THE INVENTION

The present invention relates to a spinning reel for fishing and particularly to the spinning reel for fishing in which structure of such reel was simplified by improving the structures of a drag sound generating portion which can verify sensitivity of drag tightening force by generating sound with tensile restoring force, of a handle joining portion which rotates for winding its line in, and of a spool operation sound generating portion which can sense by using click sound generated from the spool operation sound generating portion with regard to "fish signal" (defined as the feeling that a fish swallowed the bait).

In general, the spinning reel comprises a spool in which the line paid out is wound by rotating a handle, a drag sound generating portion in which sound is generated by restoring force of a plate spring installed therein and sensitivity of the drag tightening force can be verified, and a spool operation sound generating portion in the fish signal can be sensed by using click sound generated therein.

The conventional reel drag sound generating portion used for the aforesaid objects was disclosed in the Japanese Utility Model Publication No. 83-68774 and the Korean Utility Model Registration No. 91-9099 which was filed by the present inventor and applicant prior to the former application.

However, in the case of the former, its structure shows that in the external cylinder of helix screwed on a drag adjustment handle shaft, a concavo-convex portion is formed, on the said handle shaft a center hole of the spring holder is inserted, and a plate spring is joined in the supporting groove of the holder, whereby upper plate spring conducting elastic operation on the concavo-convex portion and generating the drag sound. The aforesaid invention had the difficult manufacturing process as the separate spring holder for supporting the aforesaid plate spring was required to manufacture, and had a trouble to use the separate tools for disassembling and assembling as the spring was required to compressively disassemble and assemble in a supporting groove. Also, the invention had the drawback which its operation was not smooth as compressive operation is generated when the upper plate spring elastically installed on the concavo-convex portion is operated.

In the case of the latter, its structure shows that on circumferential surface in the front of a drag knob, a built-in element having a plurality of concavo-convex portion is formed, a spring holder engaging a plate spring into guide holes on the top and both sides in the inner portion is installed on both folded ends of the aforesaid driving gear shaft, whereby sound is generated by rotation of the drag knob. It was somewhat improved in the respects of evils for disassembling and assembling and operation of the plate spring. However, this invention also had the complicated manufacturing process as the separate spring holder was required to manufacture as in the former, as well as it had problems of increasing the costs.

A handle joining portion of the conventional reel was constructed as shown on FIG. 8 such that a driving shaft 104 having inner surface of angled shape is mounted on a rotary shaft 102 having circumferential surface of angled shape integrated with a handle, a screw 105 is passed through in the middle of a washer after inserting the washer 106 having angled shape or circular shape, and a male helix portion 107 of the screw is engaged by a female helix portion 103 formed inside the rotary shaft 102, whereby the handle is mounted on a side of the reel body. In such a state that the handle was fastened, the handle was slackened due to gap between the rotary shaft 102 and a driving shaft 104. In the event that the assembled screw is slackened due to its use for a long time, the handle is severely slackened so that the screw can be loosed and removed when the handle is rotated, or its operation cannot be so smooth.

Accordingly, as shown on FIG. 9 to settle such problems, a screw 205 was passed through the center of a collar 208 after forming an inclined slitting surface 207 on the ends of a rotary shaft 202 and placing the separate collar 208 having the opposing inclined slitting surface 207', and the inclined slitting surface 207' of the collar 208 was pressurized tight along the inclined slitting surface 207 of the rotary shaft 202 partially on a side of an inner driving shaft 204, thereby slackening of the handle is prevented. As the construction process of slitting ends of the rotary shaft and one end of the collar was added and the separate collar was required, increase of the parts has become a main cause of increasing the manufacturing costs. When tightening force of the screw was loosened, slackening can be generated, and when it is severely loosened, the screw becomes untied.

The conventional reel spool operation sound generating portion, as shown on FIG. 10, has the structure that an actuating means 306 is made of metals equipped with the inner circumferential surface of a spool 300 generating sound by touching to a tooth space 305 of a click gear 302 integrated with a spool center shaft 301, a power actuated means 304 folded unto the bottom of center, one side of said actuating means 306 is resiliently placed against a coil spring 309 fixed by hanging on a seperate projection 307 protruded on the inner circumferential surface of the spool 300, and a projection 303 is inserted into the hole of the center shaft and fixed with an E-ring 308. The aforesaid invention had a disadvantage that fails to provide a swinging operation sound as the actuating means resiliently placed against the coil spring is formed with metallic means and a dead crushing sound is generated by striking of the folded power actuating means. Also, it had the problems of a lowering of productivity due to complicated construction and of increasing the manufacturing costs.

SUMMARY OF THE INVENTION

An object of the present invention is to provide a spinning reel for fishing in which structure of a drag sound generating portion was improved by placing a plate spring with a protruded rod on both sides temporarily mounted and without a spring holder, a screw was eccentrically constructed without adding separate parts to the aforesaid handle joining portion, the handle was securely fastened by eccentric tightening force without gap between a rotary shaft and a driving shaft thereby preventing slackening, and a click spring was mounted on the aforesaid spool operation sound generating portion such that more swinging sound is generated, tightening force can be sensed, the numbers of parts are reduced with simplification of structure and manufacturing costs can be reduced.

This and other objects and novel features of the present invention will become more apparent from the following description when taken in conjunction with the accompanying drawings.

DESCRIPTION OF THE PREFERRED EMBODIMENT

Figure 1:
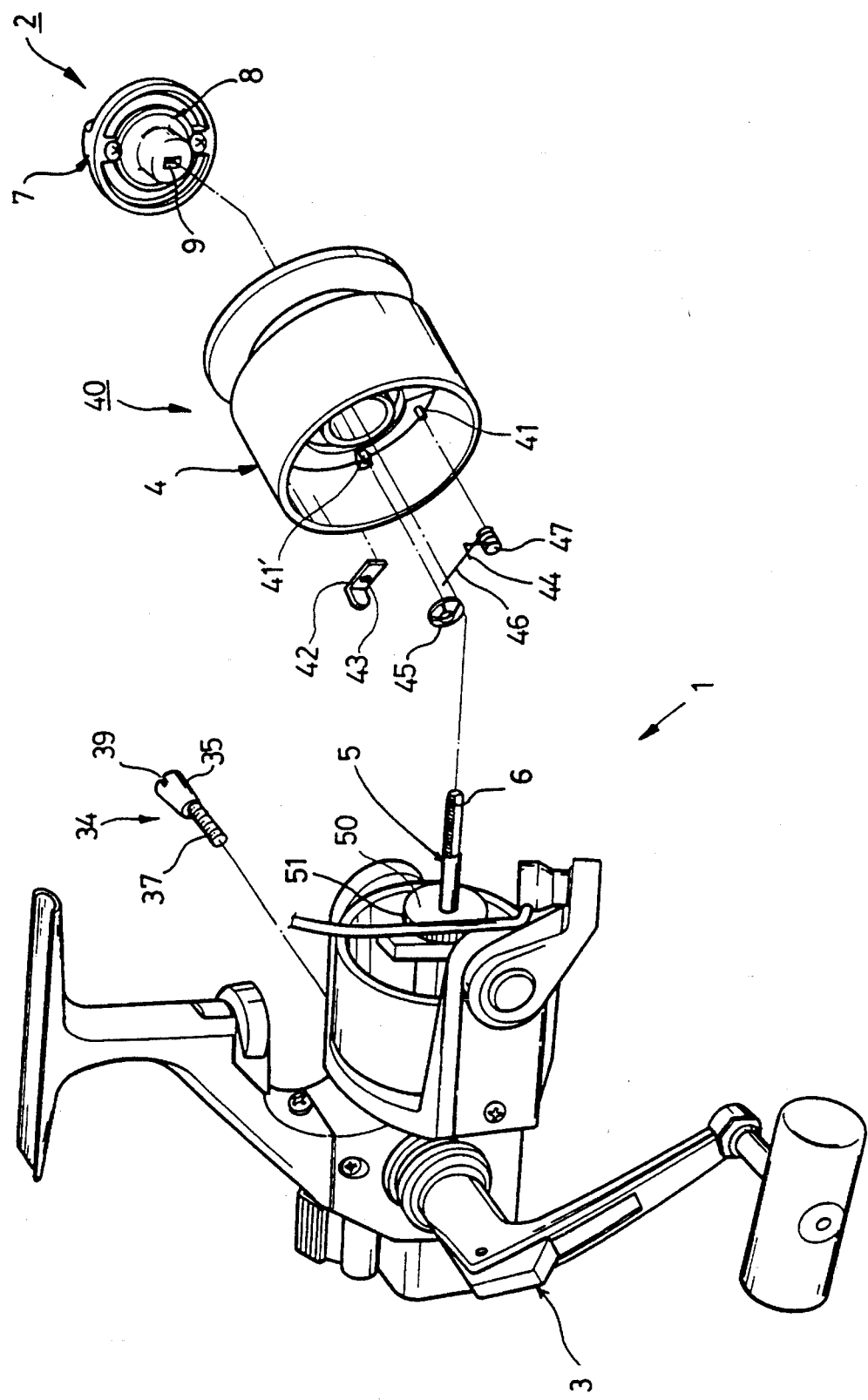
FIG. 1 is an exploded perspective view of the whole present invention.

Hereinafter, the present invention will be described in detail with reference to the accompanying drawings. As shown on FIG. 1, a spinning reel for fishing 1 according to the present invention comprising a drag sound generating portion 2 as shown on FIG. 2 and FIG. 3, in which a helix portion of ends of a spool shaft 5 where a spool 4 is mounted in the middle is passed through a hole of rectangular shaft 9 of a drag cap 8 covered in the rear of a drag knob 7 and screwed in an inner nut 10, a built-in element 12 forming a concavo-convex portion 11 on inner whole circumferential surface is integrated with said drag knob 7, and upper end of a plate spring 13 placed inside a drag cap 8 is resiliently touched with said concavo-convex portion 11, so as to generate drag sound; a handle joining portion 30 (shown in FIGS. 4 and 4a) in which a handle 3 is mounted; and a spool operation sound generating portion 40 in which a spool 4 is mounted; wherein both folded ends 14, 14' of a plate spring 13 are caught by protruded rods 15, 15" on both inner sides of said drag cap 8 and threadjoining portions 16, 16' are formed on both sides of outer circumferential surface of the built-in element 12 of the drag knob 7.

Accordingly, the drag sound generating portion 2 having the aforesaid construction is completely assembled such that a nut 10 is inserted into a nut hole 17 of the drag knob 7 forming the concavo-convex portion 11 on inner whole circumferential surface, a compression spring 18 is inserted into the middle of inner drag cap 8 in which protruded rods 15, 15' are mounted inside, both folded ends 14, 14' of the plate spring 13 are caught by the protruded rods 15, 15' on both sides of the inner drag cap 8, then the drag knob 7 is joined by the drag cap 8, a thread 19 is screwed on thread joining portions 16, 16' on both sides of the drag knob 7, a shoulder of head portion of the thread 19 is adhered closely to a top of the drag cap 8 so as to fix therein.

In such a state that assembling thereof was complete as described above, if the hole of a rectangular shaft 9 of the drag cap 8 is inserted into a spool shaft 5 and rotated, a helix portion 6 formed in ends of the spool shaft 5 is screwed on a nut 10 inserted in the nut hole 17 of the drag knob 7 and thus the drag sound generating portion 2 is mounted on the spool shaft 5 of the reel 1.

Figures 4, 4A:
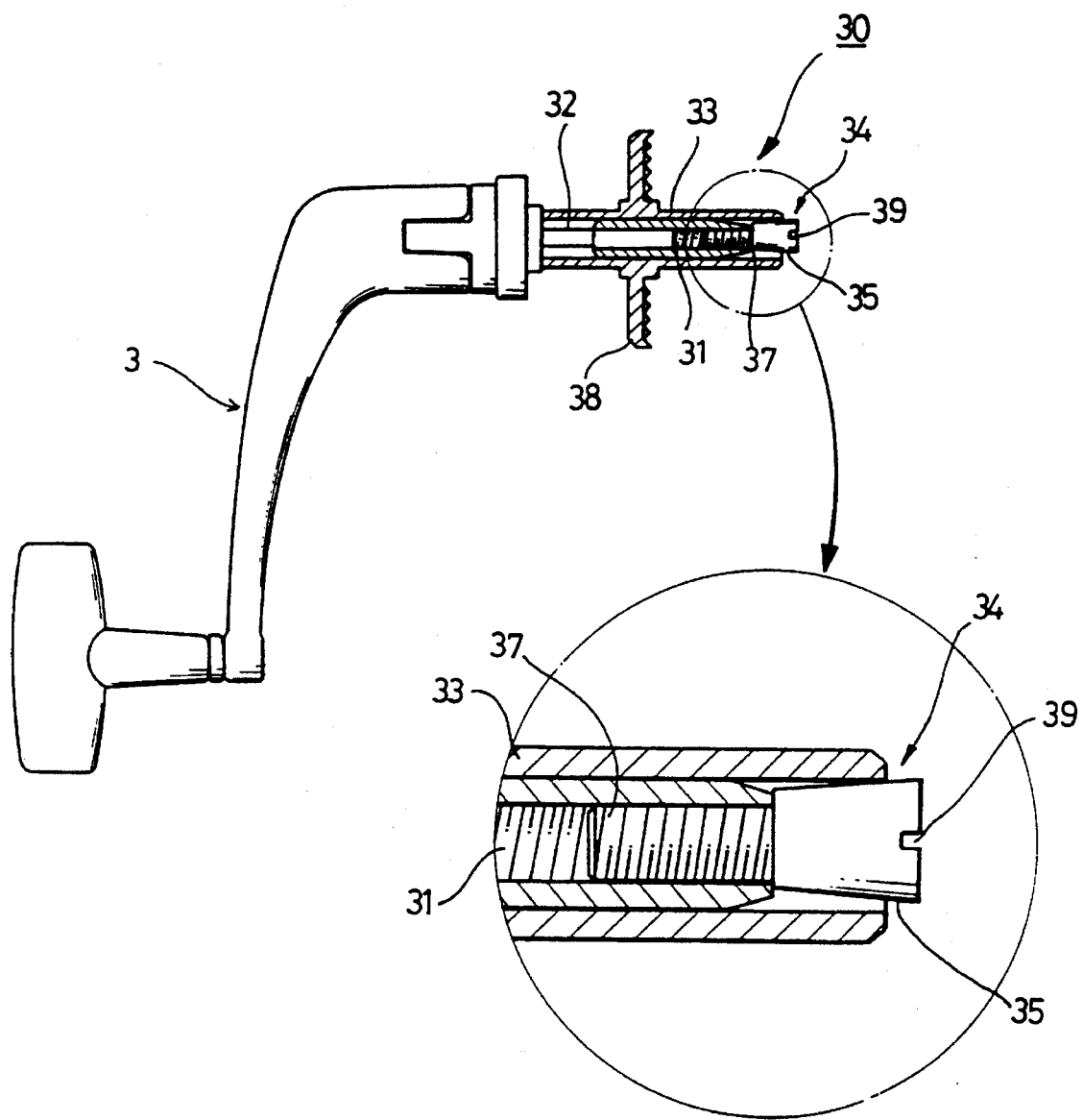
FIG. 4 is a section view of a separate handle joining portion of a spinning reel according to the present invention.
FIG. 4a is an enlargement of a portion of FIG. 4.

As shown on FIG. 4, a handle joining portion 30 in which a handle 3 of the reel I according to the present invention is fixed is constructed such that in the handle joining portion 30 in which a driving shaft 33 is placed unto a rotary shaft 32 of a handle 3 having circumferential surface of angled shape and forming a female helix portion 31 inside, a male helix portion of the screw is screwed on the female helix portion 31 of the rotary shaft 32, and said handle 3 is mounted on a side of the reel body, wherein a screw 34 screwed on a female helix portion 31 of a rotary shaft 32 by passing through the middle ends of a driving shaft 33 comprises a head portion forming a tapering surface 35 of narrow bottom and wide top, and an eccentric helix portion 37 on its head portion.

Figure 5:
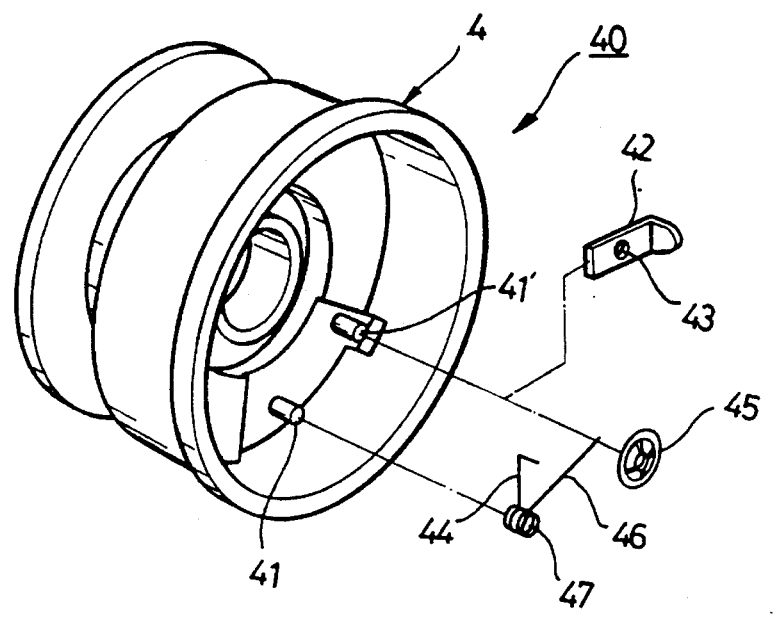
FIG. 5 is an exploded perspective view of a spool operation sound generating portion of the reel according to the present invent ion.
Figure 6:
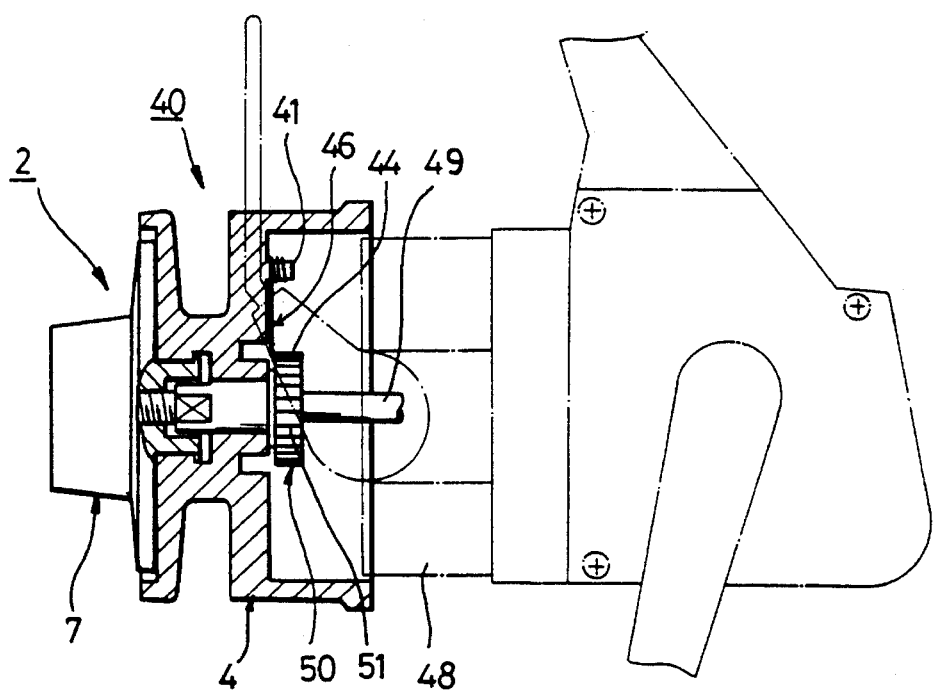
FIG. 6 is a section view illustrating assembling state of the spool operation sound generating portion of the reel according to the present invention.
Figure 7:
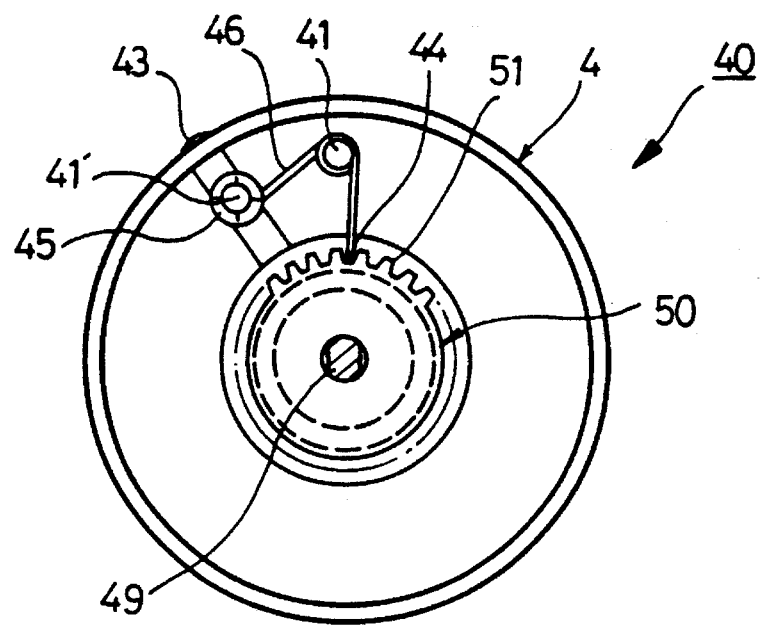
FIG. 7 is a front elevation illustrating assembling state of the spool operation sound generating portion of the reel according to the present invention.
Figure 8:
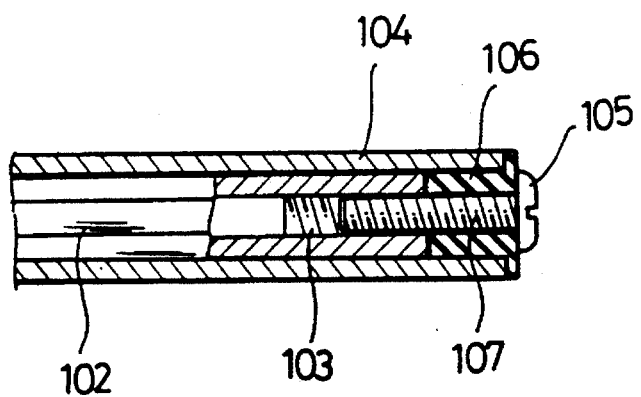
FIG. 8 is an enlarged section view illustrating a handle joining portion of the conventional reel.
Figure 9:
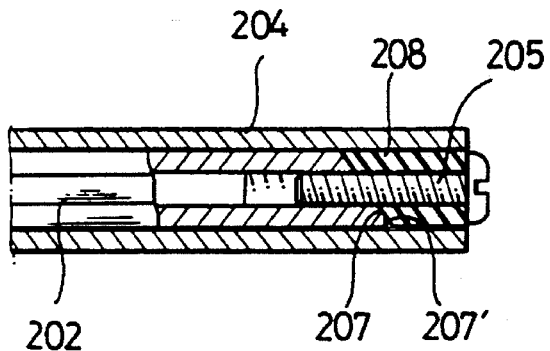
FIG. 9 is an enlarged section view illustrating the handle joining portion of the another conventional reel.
Figure 10:
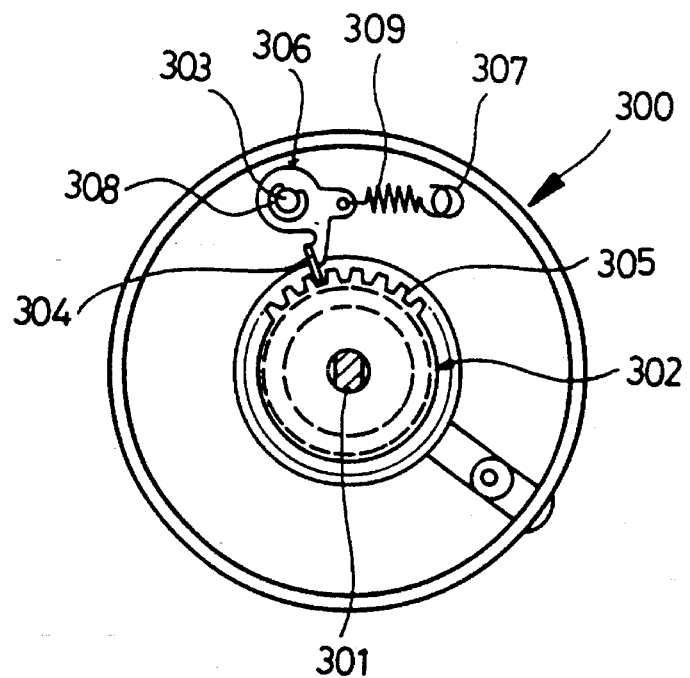
FIG. 10 is a section view illustrating assembling state of a spool portion of the conventional reel.

As shown on FIGS. 5, 6 and 7, a spool 4 operation sound generating portion 40 of the reel 1 according to the present invention is constructed such that a projection 41 integrated with inner circumferential surface of the spool 4 is integrated with a projection 41' in which a hole 43 of a line stopper 42 being inserted from outer circumferential surface of the spool at regular interval, wherein a folded power actuated pin 44 is integrated on its one side and touched with the projection 41' on its other side, and a hole 47 of center shaft of a click spring 46 fixedly assembled by a coned disk cap 45 is inserted into said projection 41.

Referring to FIG. 4, 38 represents a driving gear, 39 represents a tightening groove, 48 a rotor, 49 a spool center shaft, 50 a click gear and 51 a tooth space of the click gear.

The operation of the above described mechanism and further constructional features and advantages will be best appreciated from the following.

Figure 2:
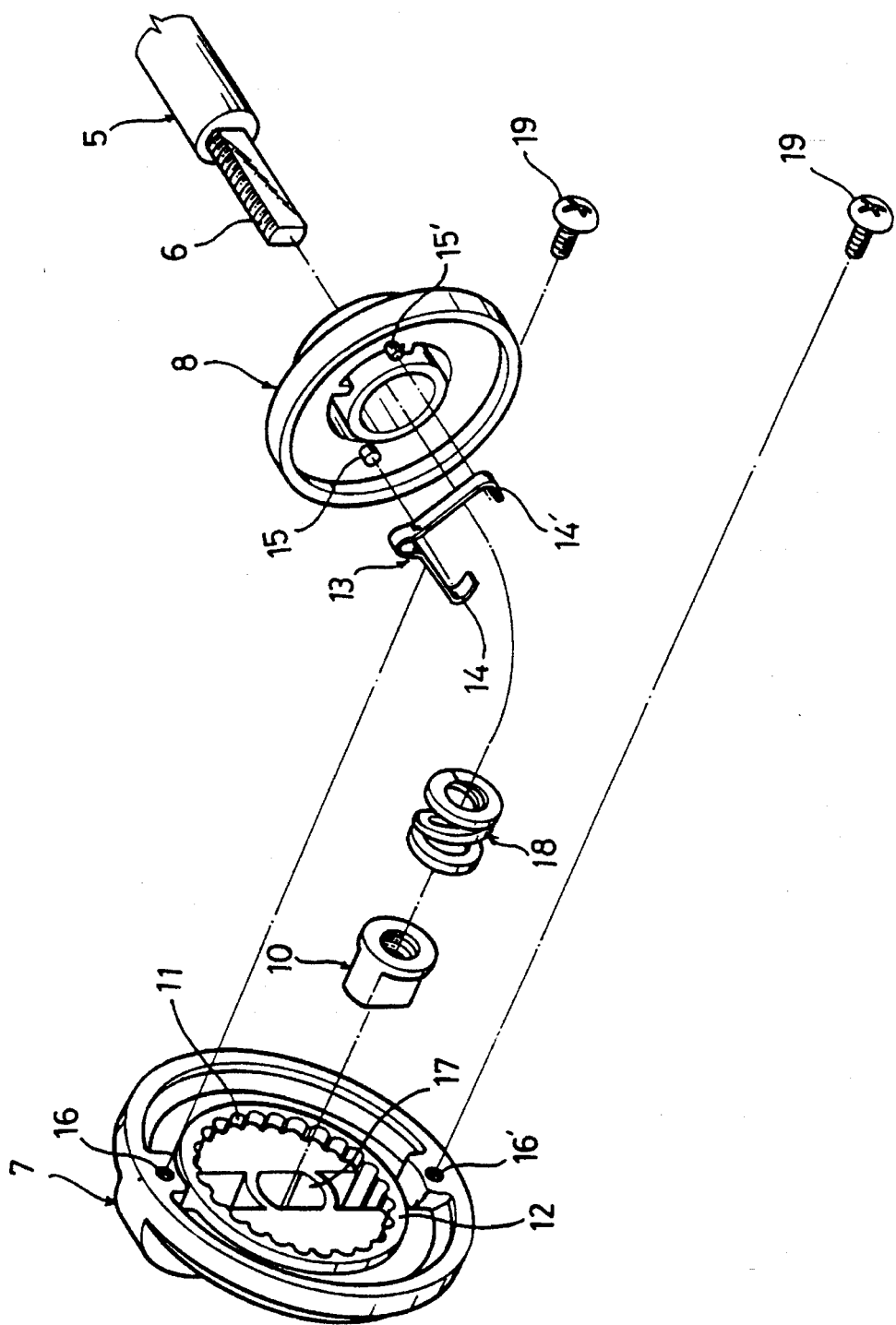
FIG. 2 is an exploded perspective view of a reel drag sound generating portion according to the present invention.
Figure 3:
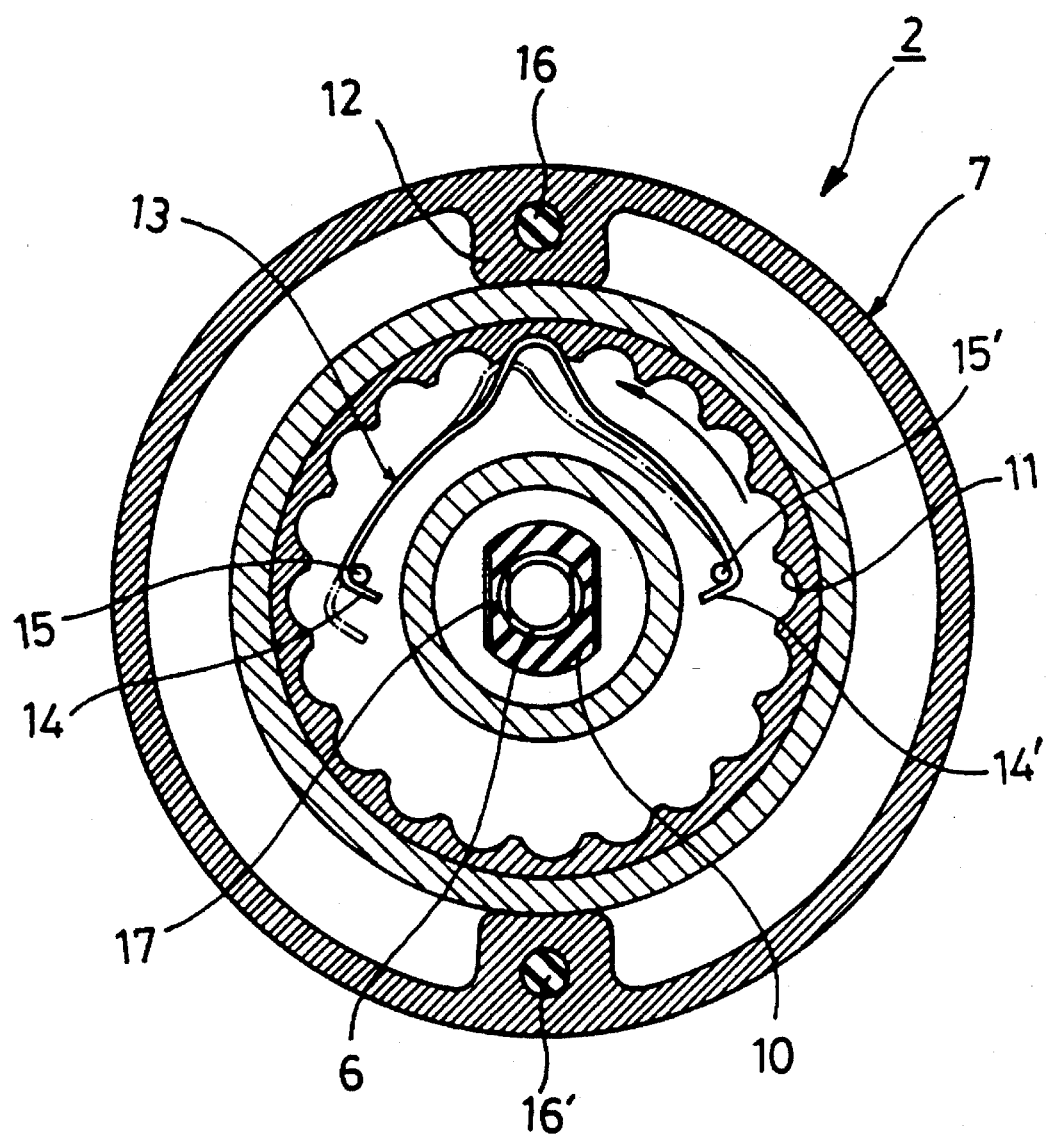
FIG. 3 is a section view illustrating assembling state and operation of FIG. 2.

As shown on FIGS. 1 and 2, said drag sound generating portion 2 is operated such that a hole 9 of rectangular shaft of a drag cap 8 is abutted on a slitting surface of a helix portion 6 formed in ends of the spool shaft 5 when adjusting the drag by rotating the drag knob 7 so as to prevent racing and generate compressive force on a compressive spring 18, and upper ends of the plate spring 13 are resiliently placed against a concavo-convex portion 11 formed on the inner whole circumferential surface of a built-in element 12 of the drag knob 7 so as to generate drag sound.

Accordingly, operation of the plate spring 13 can be more smoothly achieved as a folded end 14 caught by the other protruded rod 15 is flown to the direction of rotation(the arrow direction) in such a fixed state that one side of a folded end 14' is caught by protruded rod 15' on its side.

The above described plate spring 13 would be replaceable with the same type of a wire rope.

As shown on FIG. 4, a driving shaft 33 is placed onto a rotary shaft 32 having circumferential surface of angled shape of the handle 3, a screw 34 is passed through the middle of ends of the driving shaft 33, an eccentric helix portion 37 of the screw 34 is screwed on a female helix portion 31 of an inner rotary shaft 32, and then the normal tool is inserted into a tightening groove 39 formed in a head portion 36 of the screw 34 and tightened. Then, the eccentric helix portion 37 is screwed on the female helix portion 31 of the rotary shaft 32, and at the same time, a tapering surface 35 formed on the circumferential surface of the head portion of the screw 34 is adhered closely and partially to one side of inner circumferential surface of the driving shaft 33 by the tightening force, thereby said handle joining portion 30 is securely fastened without gap between the rotary shaft 32 and the driving shaft 33 so that slackening of the handle can be prevented and untying of the screw can be prevented during its use by means of close adhesion of the screw having pressure.

As shown on FIG. 5, a spool operation sound generating portion 40 according to the present invention is mounted on inner circumferential surface of the spool 4, the spool 4 is inserted into a spool center shaft 49 placed on a rotor 48, a folded power actuated pin 44 of a click spring 46 is at any time touched with a tooth space 51 of a click gear 50 integrated with the spool center shaft 49. In this state, rotating the spool 4, a click spring 46 also is rotated and at the same time the power actuated pin 44 becomes successively and repetitively touched with the tooth space 51 of the click gear 50, thereby swinging vibration sound of the click spring 46 having elasticity is generated.

As described on the above, the present invention provides the effects of simplifying the manufacturing process and of saving the manufacturing costs by mounting a protruded rod playing a role of a spring holder on both sides of a hole of center shaft of the drag cap in the drag sound generating portion without separate spring. It also provides easy assembling and disassembling together with convenient use. Further, as said handle joining portion is securely fastened without gap between the rotary shaft and the driving shaft, slackening of the handle as well as untying of the screw during its use can be prevented. Especially when slackening of the handle occurs during its use, such slackening and untying of the screw during its use can be prevented by slightly pulling the handle in order that convenient use thereof may be provided. Further, said spool operation sound generating portion may sense tightening force of the spool definitely by generation of a swinging operation sound resulted from vibration of the click spring as well as simplifying its structure, thereby smooth operation enables to obtain the effects of improving quality of products and its reliability.

What is claimed is:

1. A fishing reel comprising:

a reel body;

a handle rotatably fixed to the reel body;

a handle joining portion for fixing the handle to the reel body, the handle joining portion comprising:

a rotary shaft fixedly mounted to the handle for simultaneous rotation with the handle, the rotary shaft having a female helix portion, two end surfaces, and an external circumferential surface, a driving shaft slidably mounted on the rotary shaft and having an inner circumferential surface which conforms to the external circumferential surface of the rotary shaft, and a screw comprising:

an eccentric helix portion;

a head portion formed on the eccentric helix portion and forming a tempering surface of wide top and narrow bottom, wherein the eccentric helix portion of the screw is screwed into the female helix portion of the rotary shaft, the head portion being engaged with one of the end surfaces of the rotary shaft;

a spool shaft having a helix portion at an end opposite the reel body;

a drag sound generating portion threadably connected to the helix portion of the spool shaft;

a spool rotatably mounted on the spool shaft between the drag sound generating portion and the reel body; and a spool operation sound generating portion.

2. The fishing reel of claim 1, wherein the spool operation sound generating portion comprises:

a first projection and a second projection formed on an inner circumferential surface of the spool;

a line stopper inserted from the outer circumferential surface of the spool, the line stopper being fixedly engaged with the first projection;

a click gear fixed to the spool shaft for simultaneous rotation therewith; and a click spring comprising:

a center hole, a folded power actuated pin, and a second pin, the click spring being fixedly engaged with the second projection by the center hole thereof and being secured to the second projection with a disk cap, the folded power actuated pin being engageable with the click gear, and the second pin being engageable with the first projection.

* * * * *